United States Patent [19]

Sherman et al.

[11] 4,425,664

[45] Jan. 10, 1984

[54] MULTIPORT PROGRAMMABLE DIGITAL DATA SET

[75] Inventors: David N. Sherman, Middletown; Shiv P. Verma, Lakewood, both of N.J.

[73] Assignee: Bell Telephone Laboratories, Incorporated, Murray Hill, N.J.

[21] Appl. No.: 376,262

[22] Filed: May 7, 1982

Related U.S. Application Data

[63] Continuation of Ser. No. 851,156, Nov. 14, 1977, abandoned, which is a continuation of Ser. No. 635,299, Nov. 26, 1975, abandoned.

[51] Int. Cl.³ .................. H04B 3/50; H04M 3/00; G06F 3/00
[52] U.S. Cl. .................. 375/8; 340/825; 179/18 ES; 364/900; 364/200
[58] Field of Search ........ 375/5, 8, 9; 178/50, 178/583; 179/15 BA, 15 BV, 18 ES; 340/147 R, 151, 152, 825

[56] References Cited

U.S. PATENT DOCUMENTS

| | | | |
|---|---|---|---|
| 3,337,687 | 8/1967 | Normand et al. | 178/50 X |
| 3,370,128 | 2/1968 | Morita et al. | 178/50 |
| 3,564,509 | 2/1971 | Perkins | 364/200 |
| 3,618,021 | 11/1971 | Avakian et al. | 340/147 |
| 3,633,164 | 1/1972 | Hynes et al. | 340/147 R |
| 3,634,627 | 1/1972 | Velentini | 179/15 BA |
| 3,649,759 | 3/1972 | Buzzard et al. | 179/2 DP |
| 3,699,525 | 10/1972 | Klavins | 364/200 |
| 3,828,325 | 8/1974 | Stafford et al. | 364/200 |
| 3,842,405 | 10/1974 | Key et al. | 364/200 |
| 3,864,524 | 2/1975 | Walker | 179/15 BA |
| 4,085,449 | 4/1978 | Walsh et al. | 364/200 X |
| 4,126,898 | 11/1978 | Spangler et al. | 364/900 |

OTHER PUBLICATIONS

"Microcomputer Application to a Spread Spectrum Frequency Hopping Modem" Merkel et al. NTC Record 74, pp. 536-542: 1974.
"A Multi-Stack Microprocessor for Satellite Modems"; Gilhousen; NTC Record, 74 pp. 543-547: 1974.
"A 4800 BPS Modem Transmitter Implementation on the PMDS": Abstract: Oyekunle et al.; May 11, 1976.
"High Speed Processing with Asynchronous Modules"; NTC Record 74; pp. 515-519; Tinklepaugh et al.-Dec. 1974.
"The Radar Arithmetic Processing Element as an MTI Filter" NTC Record 74 pp. 507-514, Shay-Dec. 1974.
"Parallel & Sequential Trade-Offs in Signal Processing Computers"; NTC Record, 74-pp. 491-495; Gold, Dec. 1974.

Primary Examiner—Aristotelis M. Psitos
Attorney, Agent, or Firm—Barry H. Freedman

[57] ABSTRACT

Disclosed is a programmable universal data set which is defined as a data set that is capable of simultaneously servicing a plurality of data terminals desiring diverse types of data sets for several different transmission speeds and formats. The universal data set comprises analog and digital buffer processors adapted for interfacing with a plurality of data terminals and with a multi-input transmission medium, a high speed digital processor having a "highly parallel" structure for computing the various elemental functions of the diverse types of data sets, and a cyclic processor for controlling the operational sequence of the high speed processor to achieve the overall operation of the selected types of data sets. The cyclic processor includes means for modifying the types of data sets implemented.

11 Claims, 4 Drawing Figures

MULTIPORT PROGRAMMABLE DIGITAL DATA SET

This application is a continuation of application Ser. No. 851,156 filed Nov. 14, 1977, now abandoned which is a continuation of application Ser. No. 635,299 filed Nov. 26, 1975 now abandoned.

BACKGROUND OF THE INVENTION

1. Field of Use

This invention relates to data communication systems, and more particularly, to data communication modems.

2. Prior Art—General

With the proliferation of digital computers in stand-alone and in interactive environments, a rising need has developed for digital communications between remote computers. This need has been met, for the most part, by utilizing the existing network of analog voice-bandwidth channels employed for voice communications, i.e., the telephone network. To communicate digital signals over these analog channels which have a pass bandwidth of 300–3000 Hz, it is necessary to appropriately translate the spectrum of the transmitted digital signals into the allowable band and, upon reception, to appropriately recover the digital signals from the spectrum-translated transmitted signals. That is, it is necessary to MODulate the sent digital data with a voice-frequency carrier signal, and to DEModulate the received signal to recover the sent digital data. A digital transceiver, or data set, which is capable of the above operations is known as a MODEM.

The techniques and embodiments of data communication modems form a large body of knowledge. Reference is made herein to R. W. Lucky et al *Principles of Data Communication*, McGraw-Hill, (1968).

In general, a modem (data set) contains a digital signal port connected to a local data terminal, e.g., a TELETYPE® transreceiver, an analog signal port connected to the transmission medium, e.g., a telephone network, a modulator section, a demodulator section and a line control section. The modulator section modulates the digital signal with a voice-frequency carrier, the demodulator section converts the received modulated analog signal into a digital signal, and the line control section controls the initiation and termination of the data communication in addition to controlling various data terminal functions during the communications process e.g., half duplex or full duplex operation.

Although all data sets have the basic elements enumerated above, there exists a substantial spread in data set features and characteristics which are commercially available. This spread results from the particular needs and requirements of various applications. Included among the varying data set characteristics are: data rates—varying from 75 to 9600 bits per second; modes of operation—asynchronous for low speed data sets (1200 bits per second and lower) and synchronous for high speed data sets; modulation—frequency shift keying modulation (FSK), differential phase shift key modulation (DPSK), quadrature amplitude modulation (QAM), vestigial side band modulation (VSB), etc.; and transmission medium equalization—fixed equalization or adaptive equalization.

Modem users often require a plurality of data sets on their premises, with each of the data sets having different characteristics. Again, presently such requirements are met by installing an individual data set for each desired application. This represents a substantial investment to the customer and to the data set supplier. Also, it often occurs that a user's requirements change from time to time, such as when the user upgrades his communications capability. Again, presently, such upgrading involves the labor and expense of substituting existing data sets with the desired ones. For greater flexibility, therefore, there appears to be a need for a universal data set which can serve the functions of a plurality of data sets and which can be easily altered to provide the particular characteristics of any desired data set.

3. Prior Art—Specific

Most commercially available data sets employ discrete, basically analog techniques in implementing the various functions of different modems. As is well known, however, analog techniques present problems of component variations, accuracy, stability, noise, and others. To remedy some of these problems, attempts have been made recently to digitally perform as many of the data set functions as possible.

J. J. Merkel et al, in a paper entitled "Microcomputer Application to a Spread Spectrum Frequency Hopping Modem," delivered at the 1974 National Telecommunications Converence (NTC) at San Diego, Calif., describe a modem employing a microcomputer for processing some of the required modem signal processing. Specifically, the microcomputer in the Merkel circuit performs the data decoding, synchronization, and tracking of the receiver. The remaining elements of the receiver (IF and AGC, Frequency synthesizer, Hop generator, Matched filters and envelope detectors, and Time-base generation) are implemented by separate special purpose digital circuits. The transmitter does not employ the microcomputer at all. In effect, therefore, the Merkel data set employs the microcomputer to gain some flexibility in the detection algorithm used, such as flexibility in the value of various thresholds.

K. S. Gilhousen, in a paper entitled "A Multistack Microprocessor for Satellite Modems," delivered at the same 1974 NTC conference, describes a four stack microprocessor structure which is capable of performing the modem functions of acquisition, tracking, modulation, demodulation, data formatting, frequency synthesis, and control. Because of the particular structure chosen, the Gilhousen circuit can only implement modems which have low data rates, FSK modulation, and noncoherent demodulation. Also, the Gilhousen circuit cannot concurrently implement the functions of more than one data set.

In U.S. Pat. No. 3,649,759 issued Mar. 14, 1972, C. A. Buzzard et al describe a circuit which is capable of concurrently implementing the functions of more than one data set. This feature is achieved by consecutively connecting (multiplexing) a high-speed control processor to successive ports of the data set and by performing the functions of a data set at each port. The Buzzard et al, circuit is a fixed parameter circuit. That is, all of the multiplexed data sets are of the same type, and in particular, all of the multiplexed data sets are of the type employing FSK modulation having a fixed predetermined modulation rate and nonsynchronous demodulation.

As seen from the above, the data set art is progressing from discrete analog designs to digital designs using microprocessors; but heretofore, the need for an all digital, adaptable, multichannel, universal data set has not been met.

SUMMARY OF THE INVENTION

It is an object of this invention, therefore, to provide a fully digital data set which, through its structure and the manner in which it is used, can perform the required functions of any of a group of data sets.

It is a further object of this invention to provide a universal data set which in the context of this disclosure, is a data set that concurrently services a plurality of data communication channels, emulating thereby a plurality of data sets of a preselected type.

It is a still further object of this invention to provide a universal data set which emulates a plurality of diverse types of data sets.

It is still an additional object of this invention to provide a universal data set structure which is easily reconfigurable into different possible data set types.

These and other objects are achieved, in accordance with the principles of this invention, by a data set having a special-purpose digital computer structure controllable by function-defining inserted parameters. More specifically, the data set of this invention comprises a digital buffer processor responsive to local data terminals, an analog buffer processor responsive to an analog transmission medium, and a high-speed special purpose digital signal processor responsive to the digital and analog buffer processors. The digital and analog buffer processors provide the necessary buffer for signals traversing the interface between the data set and the transmission medium, and the high-speed processor provides the implementation for the various desired functions of the data set. The operation of the high-speed digital processor is controlled by a low-speed cyclical processor which contains the parameters necessary to define the configuration of the high-speed digital processor. These parameters, in effect, define the type of data set that is implemented at any instant. The data set of this invention further comprises a line control processor and a timing controller. The line control processor interfaces with the local data terminals to initiate and terminate communication, and the timing controller controls the timing of the various processors.

DETAILED DESCRIPTION

1. General Structure

Figure 1:
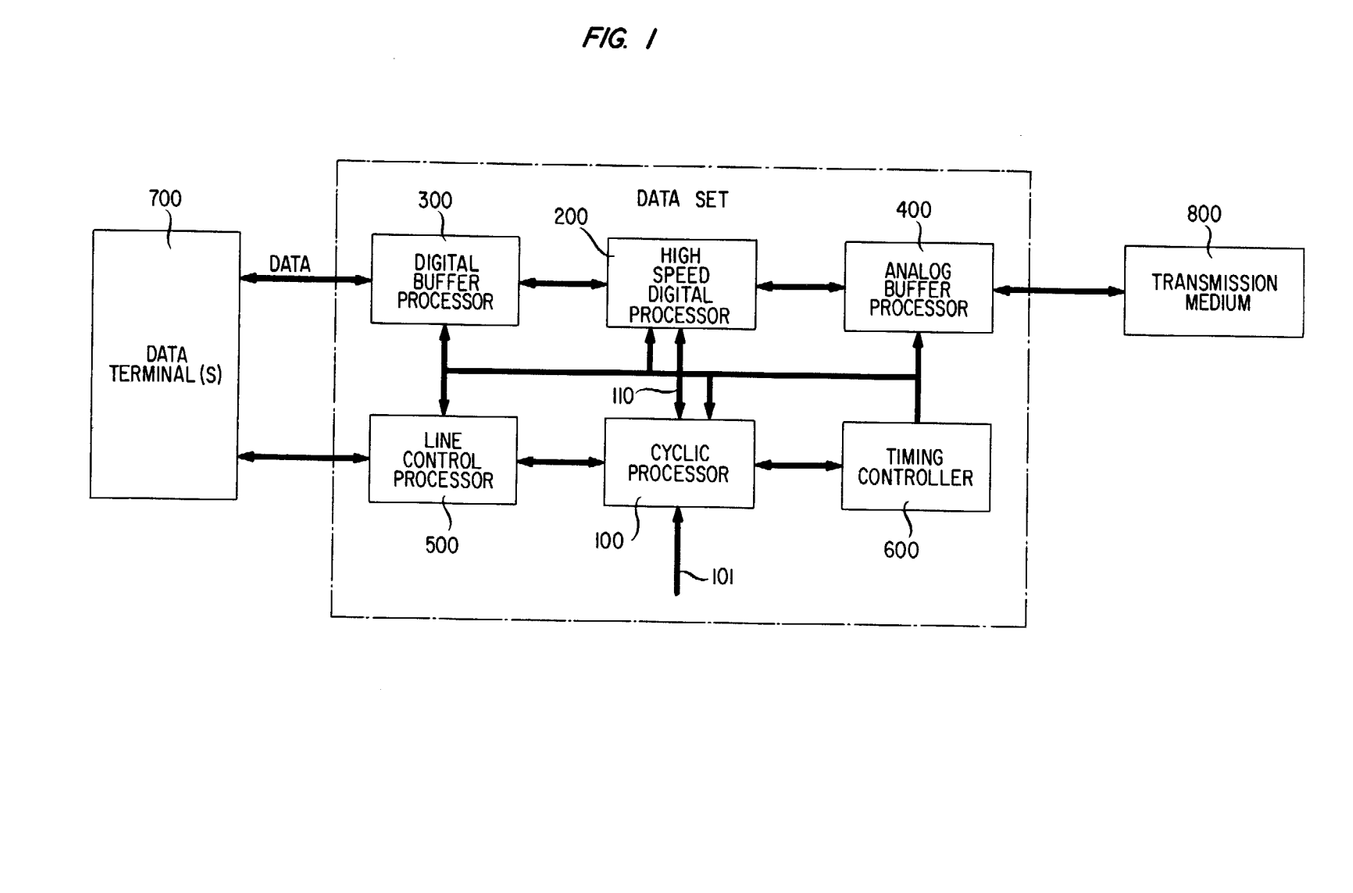
FIG. 1 depicts a general block diagram of a universal data set configured in accordance with the principles of this invention.

FIG. 1 depicts a general block diagram of a universal data set configured in accordance with the principles of this invention. At the heart of the FIG. 1 universal data set is a cyclic processor 100 and a highspeed digital signal processor 200. Processor 100 contains, among other elements, an alterable memory into which the data set structure-defining parameters are inserted. These parameters which as shown below are mere addresses of the memory, define the number and types of data sets that the FIG. 1 data set is to emulate, the priority of the various data sets, and other unique features which may be desired. The structure-defining parameters are inserted into the alterable memory of processor 100 via signal bus 101 by inserting appropriate control signals to direct the data set to emulate the desired structure. The insertion may be accomplished at the factory, by field modification, or by remote accessing of the universal data set. Cyclic processor 100 contains additional memories which store information regarding the particular computations required of the high speed processor 200 and the particular sequencing of the required computations. The information contained in the memories of processor 100 is employed by the cyclic processor to control the operation of high-speed processor 200. This control is exercised via instruction bus 110.

Processor 200 contains an arithmetic logic unit, a multiplier, a ready-only memory (ROM) look-up sine table and memory or a plurality of registers forming a temporary "scratch" storage. Processor 200 perform all the logic, delay and arithmetic operations required to implement the modulation and demodulation functions of the universal data set. In the context of this disclosure, the terms modulation and demodulation refer to whatever process is required of the modem (MOdulator/DEModulator).

In addition to the ever required modulation and demodulation functions, processor 200 performs all other data set signal manipulations such as equalization, filtering, digital data formatting and others.

The signals applied to processor 200 originate either in a digital buffer processor 300 or in an analog buffer processor 400. Digital buffer processor 300 accepts digital signals from data terminals block 700 and provides the signals, appropriately configured, to processor 200. Block 700 may comprise a single data terminal or a plurality of data terminals. Similarly, analog buffer processor 400 accepts digital signals from processor 200 and applies corresponding analog signals to transmission medium 800. Processor 400 also accepts analog signals from medium 800 and applies corresponding digital signals to processor 200. Processor 300 generally contains registers for storing and transferring data signals between processor 200 and data terminals block 700. Processor 400 generally contains an A/D (analog-to-digital) converter preceded sometimes by an adaptive gain control circuit, a D/A (digital-to-analog) converter followed by an analog low-pass filter, and buffer registers for the D/A and A/D converters. Supplementing digital processor 300, a line control processor 500 provides a signalling and control interface between data terminals block 700 and the data sets of FIG. 1. For example, line control processor 500 accepts "request to send" signals from any and all of the data terminals in block 700, informs cyclic processor 100 of such requests; and upon command from processor 500 (which command is generated in response to appropriate signals of data terminals 700) sends "clear-to-send" signals to the requesting data terminals. Similarly, processor 500 accepts indications from data terminals in block 700 to get ready for incoming data and responds with "ready" signals back to the requesting data terminals.

Summarizing with respect to the data flow, digital data is transmitted by the local data terminals (700). That digital data is modulated in the data set, converted to analog form and forwarded to the analog transmission medium (800). The transmission medium may be telephone lines, one for each local data terminal. The modulation within the data set comprises, for the signal of each data terminal, the particular modulation approach specified, be it FSK, QAM, DPSK, or other. The actual modulation process is performed digitally. In an FSK emulation, for example, the digital data bit stream of "1"s and "0"s controls the frequency of a digitally generated sine wave. The digital sine wave (samples of analog sine waves) are converted to analog form (in element 400) and are forwarded to medium 800. Analog signals coming from some remote digital terminals (e.g., over the telephone lines) are first sampled and then digitally demodulated. Again, in an FSK emulation, for example, the sampled incoming signal is a sampled sine wave. That sine wave is multiplied by a sampled, or digitized, sine wave of particular frequency developed within the data set, and from the product, the digital bit stream to be applied to the local data terminal is determined.

The overall timing of processors 100, 200, 300, 400, and 500 is controlled by timing controller 600. Controller 600 provides the various synchronizing clock signals required. All of the clock signals developed by controller 600 are derived from, and are submultiples of, a single predetermined frequency which is generated within controller 600.

2. Data Set General Timing

Digital data terminals which are adapted for operating with existing data sets develop binary bit streams of logic "0" and logic "1". These bit streams are sometimes referred to as the "digital signal", the "dc signal," or the "baseband signal." Some data terminals develop a synchronization clock in addition to the digital signal, and require a synchronization clock for reception of a digital signal. Such data terminals are said to transmit and receive synchronously. Other data sets transmit and receive asynchronously.

Within most data sets, the incoming digital signal is divided into groups of bits, with each group defining a symbol or a baud. The symbols are processed within the data set and are transmitted over the transmission medium at a rate that is proportional to the bit stream rate (called the "bit rate") and to the number of bits per symbol. This rate is called the "symbol rate" or the "baud rate". For example, in the Pell System 201C Data Set, the bit rate is 2400 Hz, the number of bits per baud is 2, and hence the baud rate is 1200 Hz. It should be noted that in the context of this application, the unit Hz simply designates a frequency of occurrence, e.g., a bit rate of 2400 Hz means 2400 bits per second.

For digital processing within the data set, the incoming symbols must be sampled before processing. It is convenient to choose a "sample rate" or a "sample clock" that is an integer multiple of the expected baud rates of the incoming data. For example, a sample clock of 7200 Hz is convenient for the 201C Data Set (providing 6 samples per baud) and is also convenient for a number of other baud rates. Also for digital processing, a high frequency master clock is required to synchronize the various basic operations within the cyclic processor and within the highspeed digital signal processor. This clock must have a substantially higher frequency than the sample clock so that a sufficient number of operations may be performed. A clock frequency of 24.567 MHz, for example, is not an unreasonable frequency when the complexity of the required data set tasks and the state of the art of integrated circuits are considered.

In establishing the timing philosophy of the universal data set of this invention, two basic clocking schemes may be considered: a fixed master clock or a variable master clock. Although the variable clock may reduce the various count-down requirements and increase the potential for different baud rate capability, a fixed clock offers some inherent simplicities. For the embodiment described herein, therefore, a fixed basic clock of 24.567 MHz is chosen. Also for the embodiment described herein, the universal data set is given the capability to concurrently service eight data terminals at an internal "frame rate" of 7604 Hz. By "concurrently" it is meant that the data terminals are serviced upon demand regardless of whether other terminals are active. Internally, the universal data set services the various data terminals on a sequential basis, as described below, essentially in accordance with the principles of time division multiplexing. A "frame" is the period of time during which a sample from each of the eight data sets may be processed. The 7604 Hz frame rate is purposely higher than the 7200 Hz preferred sample rate (which is an integer multiple of the baud rate), in order to facilitate proper synchronization of the data set's internal operation (at the frame rate) to the sample rate which is synchronized to the incoming data terminals' signals.

Figure 2:
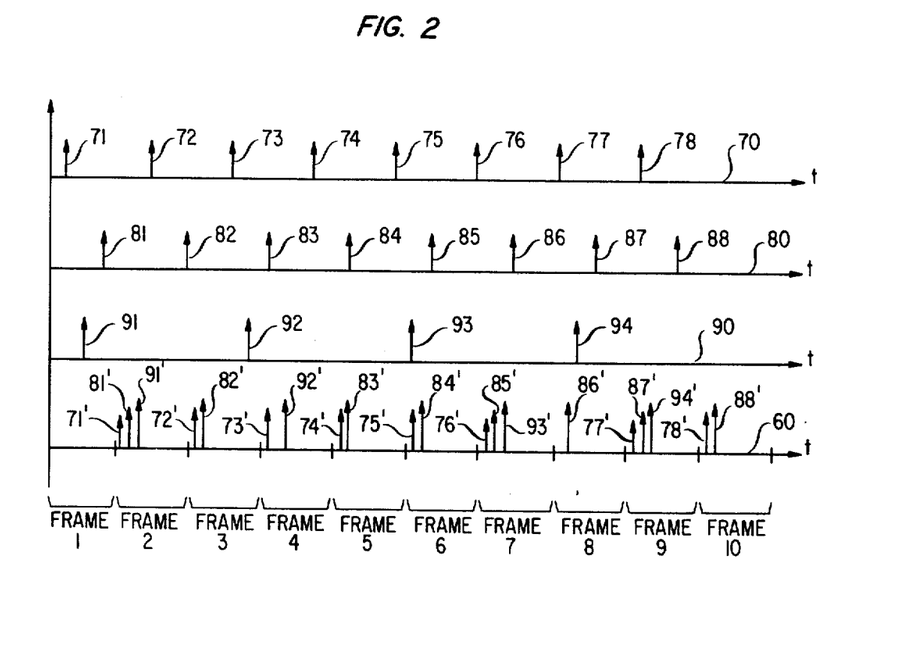
FIGS. 2 and 3 depict timing diagrams to operate the system.

FIG. 2 illustrates the manner by which the 7604 Hz frame rate permits the universal data set of this invention to operate synchronously with a plurality of data terminals with diverse sample frequencies and phases. The x axis of FIG. 2 depicts processing time, and is divided, on axis 60, into frames 1 through 10. Axis 70 depicts the samples of a first data terminal, axis 80 depicts the samples of a second data terminal, and axis 90 depicts the samples of a third data terminal. It should be noted that the first and second data terminals are sampled at a high frequency which is only slightly lower than the frame rate, and that there is an arbitrary phase difference between the samples of the first and second data terminals. It should also be noted that the third data terminal is sampled at a frequency that is half as high as that of the first data terminal and there is an arbitrary phase difference between the samples of the third data terminal and those of any other data terminal.

In accordance with the principles of this invention, samples 71, 81 and 91 of axes 70, 80, and 90, respectively, all fall within frame 1 and are processed in frame 2 as shown on axis 60 (samples 71', 81' and 91'). Axis 90 has no samples during frame 2. Accordingly, only samples 72' and 82' are processed in frame 3. In this manner, the universal data set of FIG. 1 operates at its own internal "frame rate" and yet is able to service a plurality of data terminals having their own "sample rates" that are not synchronized to the "frame rate" of the universal data set.

It should be noted, of course, that since internally to the universal data set the data samples do not appear at every frame interval (e.g., frame 4 of FIG. 2 does not contain a sample from the first data set), operations which require knowledge of past information must be carefully maintained. For example, if a recursive filter is being implemented, the past information necessary for the filter's implementation must be stored during a frame which does not receive a data sample so that the final result should not appear as if a sample of value zero has been received. Accordingly, during a "no input sample" frame, all counter values, program locations, and temporary arithmetic values must be "frozen".

Figure 3:
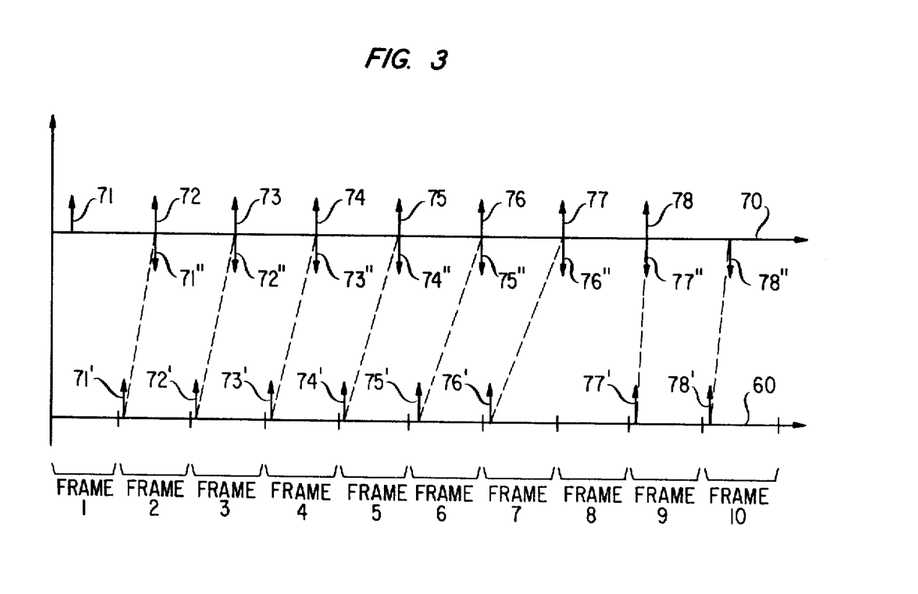

It should also be noted that the data samples processed by the universal data set are available at the output of processor 200 at the frame rate of processor 200. The actual data transmission to data terminals block 700 or to transmission medium 800 must, however, be at the sample rate. To achieve this change in synchronization from the 7604 Hz frame to the 7200 Hz sample rate requires a one frame signal delay. To illustrate this operation, FIG. 3, duplicates the x axis 60 of FIG. 2 with the data set signals as they are taken up by processor 200 (elements 71'-78'). FIG. 3 also duplicates the x axis 70 of FIG. 2 with the signals developed by the first data set (elements 71-78). By providing the aforementioned one frame signal delay, signals 71'-78' can be "clocked-in" from processor 200 into the delay by employing the frame clock, and "clocked-out" of the delay by employing the sample clock. This is illustrated by elements 71''-78'' and the dotted lines associated therewith.

As illustrated in connection with x axis 60 of FIGS. 2 and 3, each frame in the data set of FIG. 1 is divided into macro intervals equal in number to the maximum number of data terminals serviceable by the data set. Each macro interval is dedicated to processing the data of one data terminal. This is the manner in which each data terminal is serviced, if necessary, once per frame in the time division multiplex manner referred to above. In the embodiment described herein, since eight data terminals are serviceable by the data set of FIG. 1 the sum of the eight macro intervals cannot exceed 1/(7604)(8) or 131.5 μsec, whs 1600 periods of the 12 MHz clock. Each period of the clock (83.333 nsec) is called an "instruction interval" or a "micro interval".

From the above, it can be seen that there is a very limited time for processing incoming signals and for developing the various functions required of the universal data set of this invention. Therefore, the architecture of this invention, which comprises a high speed processor 200 and a (feasibly) low speed cyclic processor 100, is particularly well suited for the purposes of this invention. The cyclic processor dictates the order of processing and computes required further processing while the high speed processor computes the requested operations. This highly parallel structure is more readily appreciated from a perusal of FIG. 4 which is a more detailed block diagram representation of the data set depicted in FIG. 1.

3. Detailed Block Diagram

Figure 4:
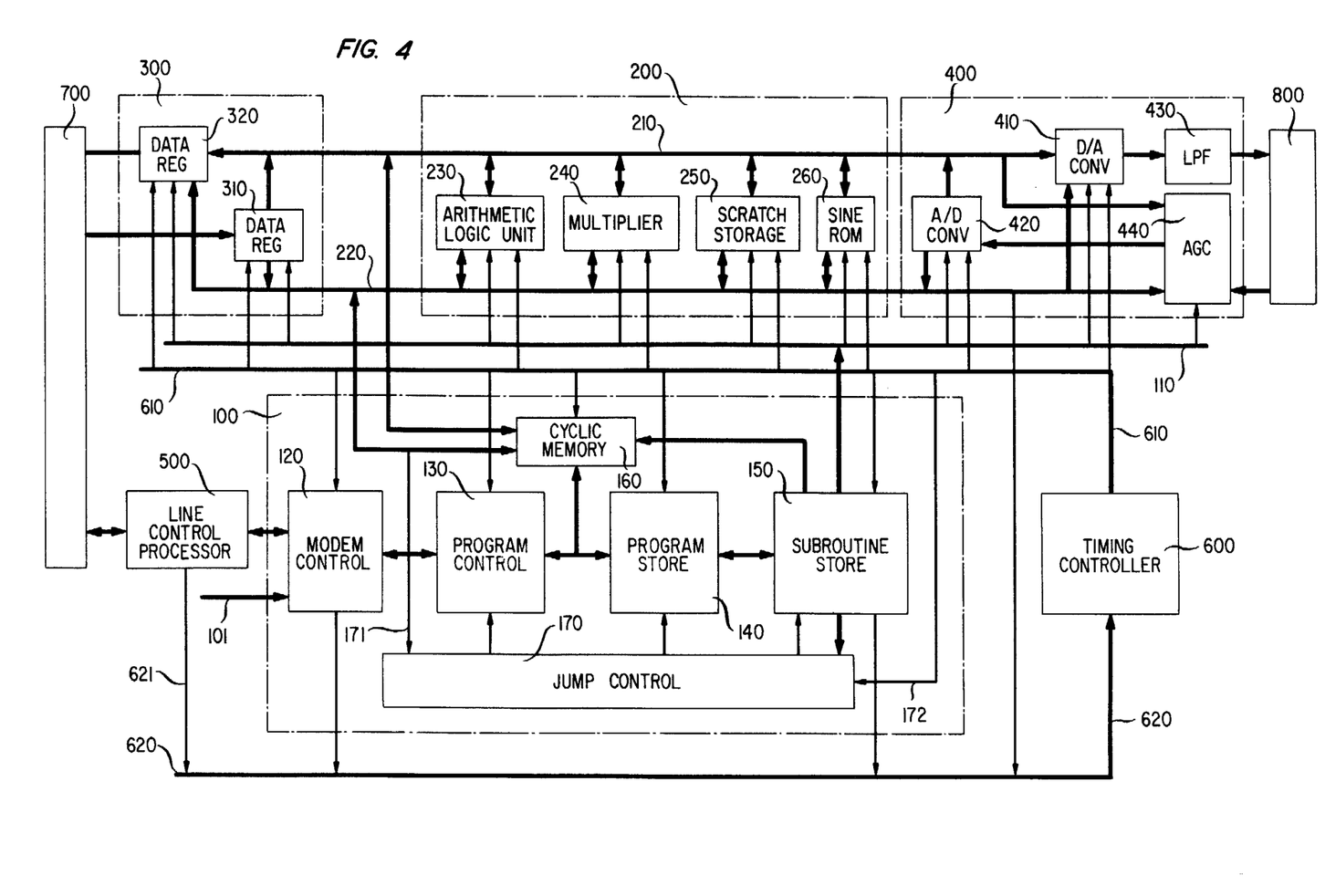
FIG. 4 depicts a detailed block diagram of the high speed processor 200.

In FIG. 4, high speed signal processor 200 comprises a first data bus 210, a second data bus 220, an arithmetic logic unit 230, a multiplier 240, a scratch store 250 and a ROM sine look-up table 260. The above elements of processor 220 are all responsive to data bus lines 210 and 220, and deliver their output signals to the same data bus lines 210 or 220. The output signals of the above elements can also be effectively disconnected from data bus lines 210 and 220. This permits efficient sharing of the data bus lines. Thus, ALU 230, for example, can operate on the data present on buses 210 and 220 and provide the result of the operation to either bus 210 or 220. Also, for example, sine ROM 260 may simultaneously (if desired) look up the contents of the memory as dictated by the "address" signal of bus line 210 or 220. The great flexibility afforded by the highly parallel structure of element 200 is, as can be appreciated, quite useful.

Arithmetic logic unit 230 (ALU) performs all arithmetic and logic operations which employ two operands. The operands are derived from data bus lines 210 and 220 and the result is applied to bus lines 210 or 220 as dictated by the instruction bus. An instruction bus 110 provides the instructions which control the various operations of ALU 230. That is, instruction bus 110 dictates the specific operations to be performed (e.g., add, subtract, AND, etc.) and the destination of the result (e.g., to bus 210, to bus 220, or to neither). ALU 230 may be implemented in a variety of ways. An ALU may be constructed in accordance with the principles described in chapter 7 of *The Logic of Computer Arithmetic* by I. Flores, Prentice-Hall, 1963, or simply, a plurality of Texas Instruments, Inc. ALU units SN74S281 may be interconnected.

Multiplier 240 performs the arithmetic multiplication operation on multiplicants derived from data bus lines 210 and 220. Since multipler 240 performs only one type of operation, it advantageously is made to always multiply the signals which simultaneously appear on bus lines 210 and 220. That is, the signal on bus line 210 is multiplied by the signal on bus line 220. To obtain a desired product, multipler 240 need only be instructed (via instruction bus 110) to impress the product output signal at the proper time on to the appropriate data bus (either on bus 210 or 220). Multiplier 240 may be implemented, for example, in accordance with the principles of Kindell U.S. Pat. No. 3,730,425 issued May 1, 1973.

Scratch store 250 is a storage element which may be a memory (dynamic or static) or a set of individual storage registers. Store 250 contains intermediate results (such as counter values for determination of elapsed intervals) which are necessary for implementing various functions of the universal data set of FIG. 4. Instruction bus 110 specifies the address of the effective storage location of scratch store 250, the affected bus line (210 or 220) and whether the information transfer should be from the data bus to the store or vice-versa. It should be noted that a memory implementation of store 250 offers greater compactness and lower cost. The use of individual storage registers, however, permits simultaneous addressing (for read and write purposes) of more than one register.

ROM 260 is also a storage element. It stores values of the sine function for the range 0 to $\pi/2$. Advantageously, the sine values are stored sequentially in ROM 260, with the ROM's address (off bus line 210 or 220, as instructed by bus 110) corresponding to the angle whose sine value is sought. For example, address 0 may contain the sine of 0 degrees, address 1 may contain the sine of 90/1024 degrees and address 1023 may contain the sine of (90)(1023)/1024 degrees. Thus arranged, a desired sine value may be obtained by having instruction bus 110 specify either the address of ROM 260 directly or the bus (210 or 220) where it is found and the data bus line (210 or 220) onto which the sine value is to be applied.

Because of the parallel structure of processor 200, bus line 110 may simultaneously provide instructions to more than one element of processor 200. For example, instruction bus 110 may instruct ALU 230 to perform a logic OR function on the signals appearing on data bus lines 210 and 220 and to provide the result on data bus line 210. It may simultaneously instruct store 250 to accept the result on data bus 210 and store it in an address A (or register A). Still simultaneously, it may instruct ROM 260 to extract the sine value of address B and present that value to data bus 220. Since multiplier 240 takes a certain amount of time to perform a multiplication operation, it is, in fact, also possible to obtain a product signal of the signals ORed by ALU 230.

Bus lines 210 and 220 extend from processor 200 and interconnect with digital buffer processor 300 and with analog buffer processor 400.

In the analog buffer processor 400, a D/A converter block 410 and an A/D converter block 420 are responsive to data bus lines 210 and 220. Converter block 410 comprises a plurality of digital-to-analog converters equal in number to the number of data terminals serviceable by the universal data set and an equal plurality of data registers. In response to commands on instruction bus 110, the data of bus 210 or of bus 220 is clocked, at the appropriate sample rate, into the shift register of the appropriate D/A converter and is converted within the D/A converter into an analog format. The analog output signals of D/A converter block 410 are applied to a low pass filter block 430. Block 430 contains a low pass filter for each D/A converter in block 410. The analog output signal of each D/A converter is thus filtered and is then transmitted to medium 800 (e.g., a plurality of telephone lines equal in number to the number of data terminals serviced by the universal data set).

For signals flowing in the opposite directions, the analog signals applied by medium 800 to the universal data set of FIG. 4 are applied to AGC block 440. Block 440, like blocks 410 and 430, contains a plurality of AGC elements equal in number to the number of data terminal serviceable by the universal data set. In response to commands from instruction bus 110, each AGC element controls the gain of the incoming signal connected thereto. The output signals of the AGC elements of block 440 are applied to A/D converter block 420 which contains one analog-to-digital converter and an associated data register corresponding to each AGC element in block 440. The signals appearing at the inputs of the individual A/D converters of block 420 are sampled at their respective sample rates, are converted to a digital format and are clocked, at the sample rate, into the corresponding data registers. In response to instructions on instruction bus 110, the output signals of selected data registers of block 420 are applied, at the proper time, to a selected data bus (210 or 220).

In the digital buffer processor (300), data bus lines 210 and 220 are each connected to an input data register 310 and to an output data register 320. Input register 310 comprises a set of registers equal in number to the number of data terminals serviceable by the data set of FIG. 4. For the illustrative embodiment described herein, data register 310 contains eight registers. Each of the registers of data register 310 accepts information from data terminals block 700 at the sample clock rate of the particular connected data terminals, and presents the clocked signals at the proper time and on to the proper data bus (210 or 220) in response to instructions from instruction bus 110. Output data register 320, like input data register 310, contains a plurality of data registers with each applying signals to different data terminals of data terminals block 700. In response to instructions from instruction bus 110, the various output registers of register 320 accept information from data bus lines 210 or 220, as directed, at the frame rate of the data set, and present such data to their connected data terminals.

In addition to being connected to the digital buffer processor, the data terminals residing in data terminals block 700 are connected to line control processor 500. Block 500 of FIG. 4 corresponds, of course, to block 500 of FIG. 1. Its function has already been described in connection with the FIG. 1 drawing.

Processor 100 is the main control element of the universal data set of FIG. 4. It comprises a modem control element 120, a program control element 130, a program store 140, a subroutine store 150, a cyclic memory 160 and a jump control element 170.

Subroutine store 150 is a programmed memory connected to instruction bus 110 which provides to bus 110 the actual instructions which control processors 200, 300, and 400. These instructions, conventionally, take the form of binary signals on bus 110. The instructions within store 150 are grouped in instruction sequences, or sets of subroutines, which are executed by applying onto instruction bus 110 the contents of consecutive storage locations in the subroutine, starting with the first instruction of the subroutine and ending with the last instruction of the subroutine. An executed subroutine causes processors 200, 300 and 400 to execute a recognizable function or subfunction of the data set, e.g., a single iteration of a single pole recursive filter, DPSK demodulation, phase locking of a phase lock loop, gain determination for the AGC elements in block 400, and others. Since store 150 is the element that directly provides the instructions to bus 110, it must contain all the subroutines which are necessary for implementing the desired function of the universal data set. However, because of the elementary nature of the subroutines (e.g., a single iteration of a single pole recursive filter), each subroutine may find use in the implementation of a number of functions, and therefore, the total required number of subroutines is conveniently small.

To completely implement a major function of the universal data set of FIG. 4, e.g., an FSK modulator, a number of subroutines must be consecutively processed (with, possibly, some subroutines being processed more than once). This selection is made by program store 140 which is connected to and provides the starting subroutine addresses for subroutine store 150. Program store 140 is a memory which contains a plurality of programs, each of which contains a list of starting addresses of the desired subroutines. For example, there is a program stored for an FSK modulator, an FSK demodulator, a DPSK modulator, and others.

Having thus implemented the major functions, a collection of programs can be used to form any standard data set, such as an FSK data set, or an hybrid data set, if such a hybrid data set were desired, such as a data set which receives FSK signals and transmits PSK signals. The grouping of programs to define a data set structure is implemented in program control element 130. Element 130 is connected to program store 140, and like the program store, element 130 is a memory which supplies a sequence of starting addresses, which in this case are addresses in program store 140 where the programs of the required data set's major function are residing.

As stated previously, the universal data set of this invention can service a plurality of data terminals which may require diverse types of data sets. Additionally, the universal data set of this invention can be made to present a different type of data set to a particular data terminal. With the unique structure of this invention, this flexibility is provided by modem control element 120 which is connected to program control element 130. In the illustrative embodiment described herein, modem control element 120 contains eight locations; that is, eight locations in a set of registers or in a memory. During the first macro interval the first location is accessed, during the second macro interval the second location is accessed, and so on until during the eighth macro interval the eighth location is accessed. Each location specifies the type of data set that is to be implemented by the universal data set of this invention dring a particular macro interval. Since during each macro interval a different data terminal is serviced, as indicated supra in the "Data Set General Timing" section, each data terminal is effectively connected to a data set of the type specified in the element 150 location which is accessed at the time the data terminal is serviced (when the terminal is, in fact, active. This specification takes the form of an address which is supplied by the manufacturer or user on bus 101, is stored in element 120 and is applied to program control element 130. The addresses contained in element 120 indicate where in element 130 a particular data set is realized. In accordance with the principles of this invention, bus 101 is connected to modem control element 120 to enable modification of the types of data sets which are implemented by the universal data set. The signal to bus 101 may be applied by directly accessing the universal data set or may be remotely applied via transmission medium by routing bus 101 through the analog buffer processor interface. Should a manufacturer wish not to permit the abovementioned modifications, the addresses in element 120 may be preset during manufacture, and bus 101 may be totally eliminated.

For appropriate computation of the diverse functions of the various data sets, parameter information (in addition to instructions or data) must be provided to processor 200 and, to a lesser extent, to processors 300 and 400. Such information may include filter constants, multiplicative constants, masking data words and other values which may even be known a-priori on which may be derived from the computations of processor 200. Therefore, contained in processor 100 is cyclic memory 160 which, in response to signals from program control element 130 and to read/write commands from subroutine store 150, provides the necessary storage of and access to the desired constants. Memory 160 presents data to and accepts data from data buses 210 or 220, as directed by subroutine store 150.

To increase the flexibility of processor 100, jump control element 170 is included to provide a means for jumping from one location within the processing sequence of the universal data set to another location in the sequence. An "unconditional jump" capability is provided by connecting jump control element 170 to the subroutine store, and a "conditional jump" capability is provided by connecting jump control element 170 to data bus 220 (line 171 in FIG. 4). In response to signals from instruction bus 110 (via line 172), control element 170 affects program control element 130, program store 140 and subroutine store 150. Jump control element 170 may simply be implemented with gates which are appropriately enabled by line 172 to test the logic level on data bus 220 or the logic level at signals provided by subroutine store 150.

In addition to bus lines 110, 120 and 220, there are included in the data set of FIG. 4 a timing bus 610 and a timing bus 620. Timing bus 610 delivers timing control signals from timing controller 600 to all other elements of the universal data set, and timing bus 620 provides basic timing information to timing controller 600 from selected elements of the data set. Thus, line control processor 500 provides "sending" clock information of the active terminals of block 700 to timing controller 600 (line 621), while bus 610 provides to processor 600 the "received" clock information. Modem control element 120 provides to controller 600 the basic timing information for each implemented data set, and controller 600 provides to modem control element 120 the basic frame timing clock for progressing element 120 through its memory locations. Subroutine store 150 provides to controller 600 "receiver timing" correction information (for synchronous data set implementations), and receives from timing controller 600 the basic clocking information for progressing element 150 through its memory locations. In some data set implementations, timing signals (or corrections therefor) must be computed. To this end, a signal path is provided (line 622) for controller 600 to receive information from data bus 220. Finally, controller 600 provides, via bus 610, timing information to the D/A and the A/D converters of processor 400; to ALU 230, multiplier 240, storage 250, and sine ROM 260 of processor 200; and to the input and output data registers of processor 300.

What is claimed is:
1. A programmable data modem comprising:
   a digital processor,
   a plurality of data ports,
   a first alterable memory containing a plurality of data set parameters,
   a second alterable memory containing a plurality of basic data set implementing operational sequences of instructions, and
   control means responsive to said first and second memories for controlling said digital processor simultaneously in accordance with preselected data set parameters and preselected operational sequences to process the various signals at first ones of said data ports according to different parameters, and to deliver processed signals to second ones of said ports.
2. Apparatus for transferring data between a plurality of digital data terminals (700) and a transmission medium (800) comprising:
   a digital signal processor (200) for performing a plurality of data set functions which collectively implement at least first and second types of data transfer arrangement;
   a cyclic processor (100) arranged to store a plurality of sequences of instructions, each of which enable said digital signal processor to perform an associated one of said plurality of functions when said instruction sequence is executed by said processor;
   means (300) for sequentially coupling signals originating in each of said data terminals to said digital signal processor for transfer to said transmission medium in accordance with a selected one of said transfer arrangements; and
   means (400) for coupling signals from said transmission medium to said digital signal processor for sequential transfer to each of said data terminals in accordance with a selected one of said transfer arrangements.
3. A digital signal processor arranged to interconnect at least one data terminal with a corresponding transmission path, said data terminal arranged to transmit and receive digital information and said transmission path arranged to carry analog signals modulated by digital information, said processor including:
   (a) means for modulating said digital information transmitted by said data terminal prior to application to said transmission path, and

(b) means for demodulating said modulated signals to recover said digital information received by said data terminal, CHARACTERIZED IN THAT said modulating and demodulating means includes:

(c) a high-speed digital processor for performing various arithmetic functions on said signals, and (d) a cyclic processor containing an alterable memory adapted to control the sequence and nature of the operations performed by said high-speed processor in accordance with user defined inputs.

4. A digital data set arranged to (1) modulate an outgoing voice frequency carrier in accordance with first digital signals originating in a data terminal before application to an analog transmission medium path, and to (2) demodulate incoming modulated voice frequency carrier signals received from said transmission medium path to recover second digital signals destined for said data terminal, said data set including:

buffering means for converting signals applied to said data set to a desired digital format, a high-speed digital processor jointly responsive to said buffering means and a sequence of control signals for sequentially modulating or demodulating applied signals in accordance with a desired modulation or demodulation approach, and a cyclic processor for generating said control signal sequence in accordance with stored program instructions.

5. A data set including means for modulating and demodulating incoming digital and analog signals respectively in accordance with a plurality of different types of modulation, the type of modulation being dependent upon control signals generated by said data set, and means for selectively providing the control signals corresponding to said plurality of different types of modulation to said modulating and demodulating means whereby simultaneous processing of different types of modulation may be effected.

6. A data set including:

a digital signal processor for performing, in response to stored control signals, operations including modulation, demodulation, filtering and equalization associated with a particular type of data set, and means for providing said control signals to said digital signal processor to perform said operations in desired sequences on applied signals.

7. The invention defined in claim 6 further including:

first means for coupling said data set to a transmission medium adapted to carry analog modulated signals destined to and generated by said data set, and second means for coupling said data set to a plurality of terminals adapted to transmit digital signals to and receive digital signals from said data set.

8. The invention defined in claim 7 further including:

means for initiating and terminating communication between ones of said terminals and remote users connected to said transmission medium.

9. A digital signal processor adapted to emulate the functions of at least two different data sets, including:

a high-speed digital processor, means including a memory for storing at least first and second sets of instructions executable by said high-speed processor, and means for sequentially applying signal samples derived from first and second data terminals to said high-speed processor whereby said first and second signal samples are sequentially processed in accordance with said first and second sets of instructions.

10. A data set comprising:

a digital buffer processor for coupling said data set to a local data terminal, an analog buffer processor for coupling said data set to an analog transmission medium, a high-speed digital signal processor responsive to said analog and digital buffer processors, for modulating signals received in said data set from said local terminal and destined for said transmission medium and for demodulating signals received in said data set from said transmission medium and destined for said data terminal, and a low-speed cyclical processor for controlling the modulation and demodulation performed by said high-speed processor in accordance with a predefined sequence of stored instructions.

11. A universal data set (FIGS. 1 and 4) for two-way exchange of digital information between a plurality of data communications terminals (700) and remote terminals connected to said data set via an analog transmission medium (800) employing carrier signal waves and having at least as many channels as there are data terminals comprising:

a digital buffer processor (300) connected to and interacting with one or more of said terminals (700) for storing samples of digital data signals in the alternative incoming to or outgoing from one or more of said terminals (700);

an analog buffer processor (400) connected to said transmission medium (800) for converting in the alternative digitally processed outgoing data signals into analog form and analog incoming data signals into digital samples;

a digital processor (200) responsive to buffered samples of outgoing data signals from said terminals (700) and to digitized analog signals from individual channels in said medium (800) for modulating a carrier signal in accordance with outgoing data signals and for demodulating a modulated carrier signal to recover signals incoming from channels in said medium; and a cyclic processor (100) for storing predetermined program instructions for controlling the sequencing of said digital processor (200) to effect one or more modulation or demodulation formats;

said digital processor (200) further comprising first (210) and second (220) bus lines;

an arithmetic logic unit (230) bridging said bus lines (210, 220) for performing additive and logic operations on signals appearing on said bus lines and delivering the result to one or the other of said bus lines under the control of said cyclic processor (100); and memory means (250, 260) bridging said bus lines (210, 220) for storing intermediate results of mathematical and logic operations of said arithmetic logic (230) and multiplier (240) units on said signal samples.

* * * * *